United States Patent
Kok

(10) Patent No.: US 9,037,096 B2
(45) Date of Patent: May 19, 2015

(54) REDUCING INSERTION LOSS IN LNA BYPASS MODE BY USING A SINGLE-POLE-TRIPLE-THROW SWITCH IN A RF FRONT END MODULE

(71) Applicant: Microchip Technology Incorporated, Chandler, AZ (US)

(72) Inventor: Yon-Lin Kok, Cerritos, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 146 days.

(21) Appl. No.: 13/787,786

(22) Filed: Mar. 6, 2013

(65) Prior Publication Data

US 2014/0256271 A1    Sep. 11, 2014

(51) Int. Cl.
*H04B 1/48*    (2006.01)
*H04B 1/44*    (2006.01)
*H04B 1/00*    (2006.01)

(52) U.S. Cl.
CPC .............. *H04B 1/44* (2013.01); *H04B 1/006* (2013.01); *H04B 1/406* (2013.03)

(58) Field of Classification Search
CPC .......... H04B 1/48; H04B 1/525; H04B 15/06; H04B 1/0057
USPC ......... 455/78, 83, 13.3, 191.3, 41.2; 370/329, 370/338
See application file for complete search history.

(56) References Cited

U.S. PATENT DOCUMENTS

| | | | |
|---|---|---|---|
| 7,719,454 B2 * | 5/2010 | Minerva | 341/144 |
| 8,213,878 B1 | 7/2012 | Robbins et al. | 455/78 |
| 8,340,034 B1 * | 12/2012 | Lee et al. | 370/329 |
| 8,379,548 B1 * | 2/2013 | Husted | 370/297 |
| 2013/0015902 A1 * | 1/2013 | Kim et al. | 327/407 |

FOREIGN PATENT DOCUMENTS

| | | | | |
|---|---|---|---|---|
| EP | 1876721 A1 | 1/2008 | | H04B 1/44 |
| JP | 2009124653 A | 6/2009 | | H01L 21/822 |

OTHER PUBLICATIONS

International Search Report and Written Opinion, Application No. PCT/US2014/019223, 9 pages, Jun. 4, 2014.

* cited by examiner

*Primary Examiner* — Minh D Dao
(74) *Attorney, Agent, or Firm* — King & Spalding L.L.P.

(57) ABSTRACT

A microwave radio frequency (RF) front end module (FEM) having a low noise amplifier (LNA) with a bypass mode uses a single-pole-triple-throw RF switch that reduces insertion loss to about 1 dB and thereby improves RF receiver sensitivity over existing technology two series connected single-pole-double throw RF switches. The single-pole-triple-throw RF switch may be three metal oxide semiconductor field effect transistor (MOSFET) RF switches that may be arranged with a common source input and isolated independent drain outputs. The RF switches may be single, double or triple gate MOSFET RF switches. The MOSFET RF switches may also be configured as complementary metal oxide semiconductor (CMOS) field effect transistor (FET) RF switches.

21 Claims, 3 Drawing Sheets

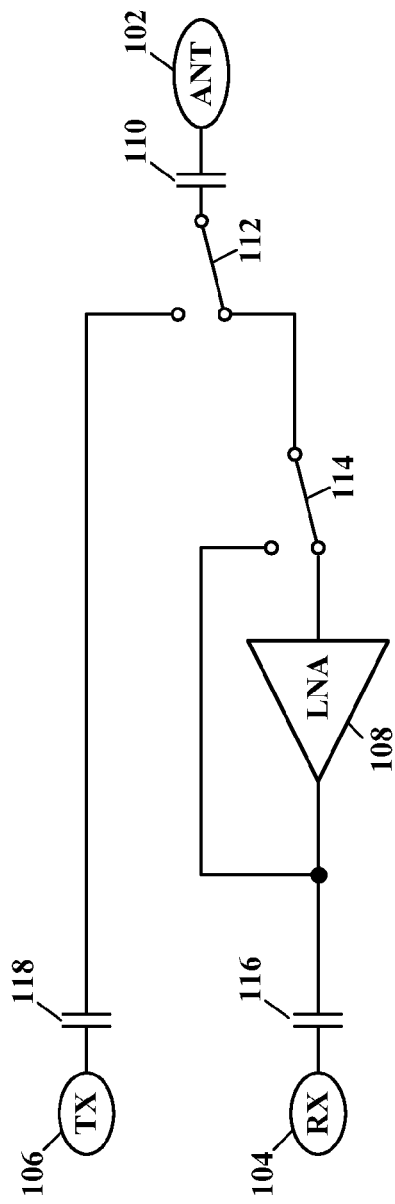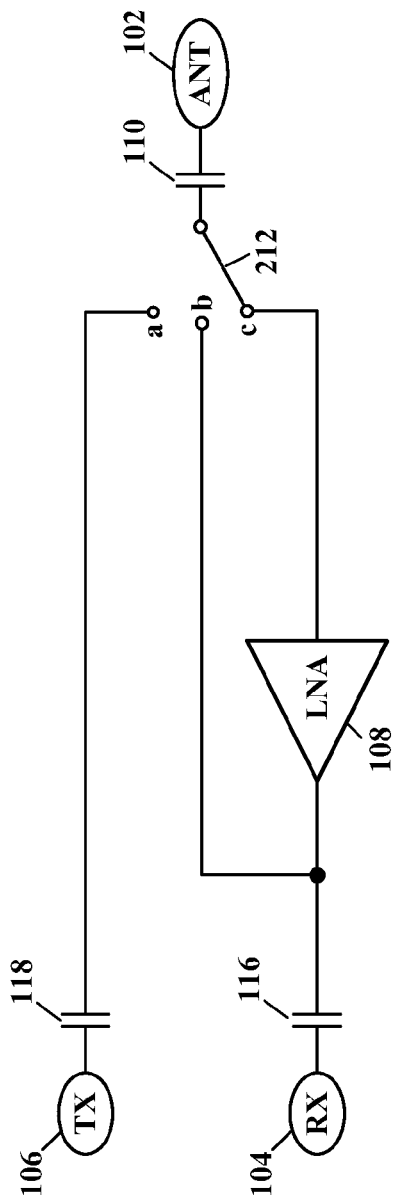
Figure 1 (Prior Technology)
Figure 2

US 9,037,096 B2

REDUCING INSERTION LOSS IN LNA BYPASS MODE BY USING A SINGLE-POLE-TRIPLE-THROW SWITCH IN A RF FRONT END MODULE

TECHNICAL FIELD

The present disclosure relates to radio frequency (RF) devices, and, more particularly, to reducing insertion loss in a low noise amplifier (LNA) bypass mode by using a single-pole-triple-throw switch in a RF front end module (FEM) of the RF device.

BACKGROUND

A RF FEM serving both transmit and receive modes of a RF device usually employs a low noise amplifier (LNA) with a bypass option implemented with two single-pole-double-throw (SPDT) switches connected in series along the receive signal path. Overall insertion loss for this LNA bypass configuration, due to the two series connected switches, is typically over 3 dB.

SUMMARY

Therefore, a need exists for an improved way to provide a LNA bypass switch configuration having less insertion loss.

According to an embodiment, a radio frequency (RF) front end module (FEM) may comprise: a low noise amplifier (LNA) having an input and an output; and a single-pole-triple-throw (SPTT) switch having a common and selectable first, second and third positions, wherein the common may be coupled to an antenna node, the first position may be coupled to a transmitter input node, the second position may be coupled to a receiver output node, and the third position may be coupled to the input of the LNA.

According to a further embodiment, a direct current (DC) blocking capacitor may be between the common of the SPTT switch and the antenna node. According to a further embodiment, a direct current (DC) blocking capacitor may be between the first position of the SPTT switch and the transmitter input node. According to a further embodiment, a direct current (DC) blocking capacitor may be between the second position of the SPTT switch and the receiver output node. According to a further embodiment, a RF disconnect switch may be between the output of the LNA and the receiver output node. According to a further embodiment, a direct current (DC) blocking capacitor may be between the RF disconnect switch and the receiver output node.

According to a further embodiment, the SPTT switch may comprise first, second and third metal oxide semiconductor field effect transistors (MOSFETs), wherein: sources of the first, second and third MOSFETs may be coupled to the antenna node; a drain of the first MOSFET may be coupled to the transmitter input node; a drain of the second MOSFET may be coupled to the receiver output node; a drain of the third MOSFET may be coupled to the input of the LAN; and gates of the first, second and third MOSFETs may be coupled to a RF switch controller.

According to a further embodiment, the SPTT switch may comprise first, second and third metal oxide semiconductor field effect transistors (MOSFETs), wherein: drains of the first, second and third MOSFETs may be coupled to the antenna node; a source of the first MOSFET may be coupled to the transmitter input node; a source of the second MOSFET may be coupled to the receiver output node; a source of the third MOSFET may be coupled to the input of the LAN; and gates of the first, second and third MOSFETs may be coupled to a RF switch controller.

According to a further embodiment, each of the first, second and third MOSFETs may comprise a single gate. According to a further embodiment, each of the first, second and third MOSFETs may comprise a dual gate. According to a further embodiment, each of the first, second and third MOSFETs may comprise a triple gate.

According to a further embodiment, the LAN and the SPTT switch may be fabricated on an integrated circuit die. According to a further embodiment, the integrated circuit die may be encapsulated in an integrated circuit package having a plurality of connection nodes thereon. According to a further embodiment, the LAN and the SPTT switch may operate at gigahertz frequencies.

According to an embodiment, a radio frequency device may comprise: a power amplifier, an input matching circuit coupled to an input of the power amplifier and a low pass filter coupled to an output of the power amplifier; and a radio frequency (RF) front end module (FEM), comprising: a low noise amplifier (LNA) having an input and an output; and a single-pole-triple-throw (SPTT) switch having a common and selectable first, second and third positions, wherein the common may be coupled to an antenna node, the first position may be coupled to an output of the low pass filter, the second position may be coupled to a receiver output node, and the third position may be coupled to the input of the LAN.

According to a further embodiment, the power amplifier, LAN and SPTT switch may be fabricated on an integrated circuit die. According to a further embodiment, the integrated circuit die may be encapsulated in an integrated circuit package having a plurality of connection nodes thereon. According to a further embodiment, the power amplifier, LAN and SPTT switch may operate at gigahertz frequencies.

BRIEF DESCRIPTION OF THE DRAWINGS

A more complete understanding of the present disclosure may be acquired by referring to the following description taken in conjunction with the accompanying drawings wherein:

FIG. 1 illustrates a schematic diagram of a conventional bypass circuit for a LNA using two series connected single-pole-double-throw switches;

FIG. 2 illustrates a schematic diagram of a bypass circuit for a LNA using one single-pole-triple-throw switch resulting in lower insertion than the bypass circuit shown in FIG. 1, according to a specific example embodiment of this disclosure;

Figure 3:
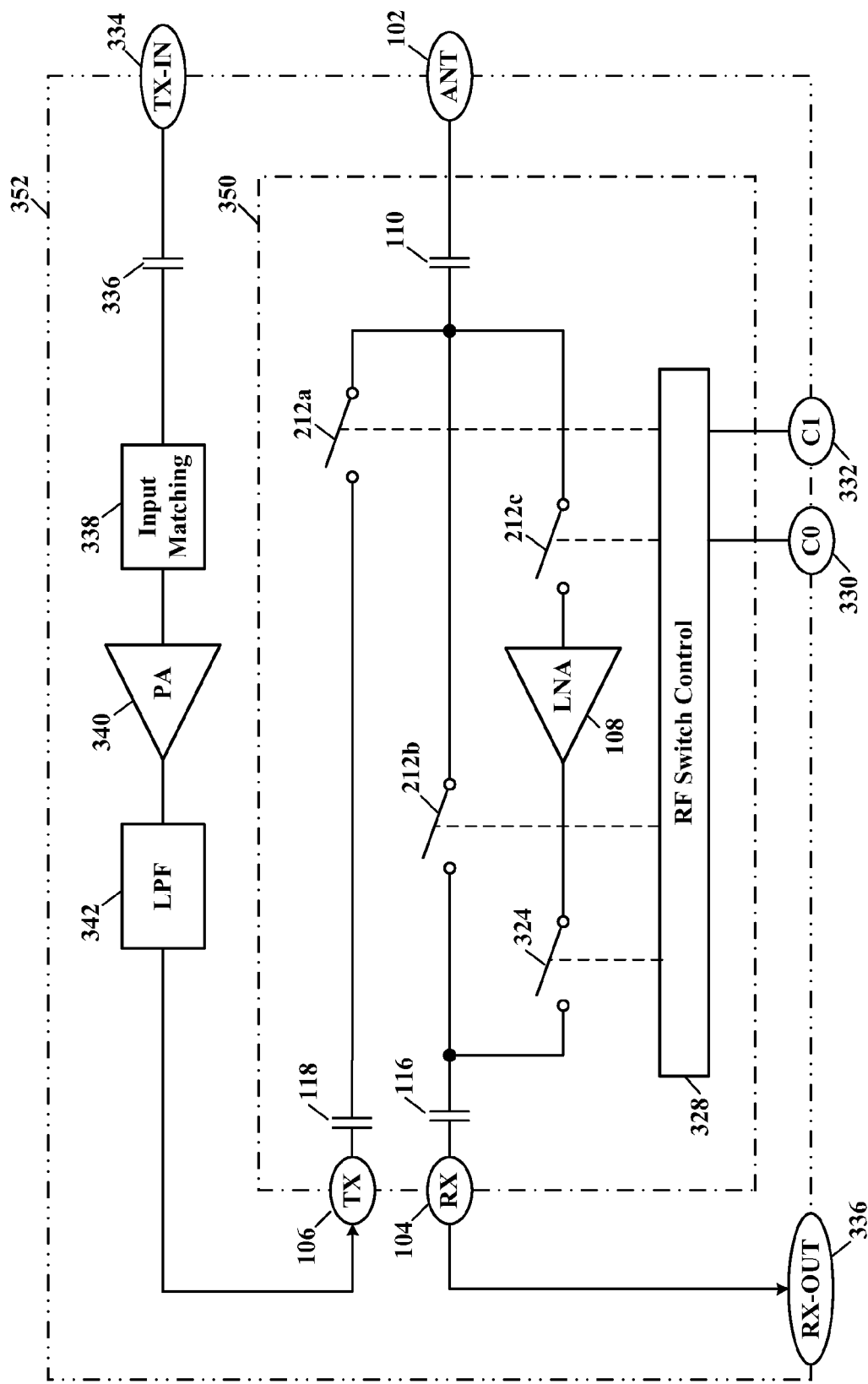
FIG. 3 illustrates a schematic block diagram of a RF device utilizing the LNA bypass circuit shown in FIG. 2.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

By using a single-pole-triple-throw switch the received RF signal travels through only one RF signal switching device, thereby reducing insertion loss to about 1 dB. Therefore, the RF receiver sensitivity is significantly improved when the LNA is in a bypass mode.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic diagram of a conventional bypass circuit for a LNA using two series connected single-pole-double-throw switches. A low noise amplifier (LNA) 108 has a bypass option implemented with two single-pole-double-throw (SPDT) radio frequency (RF) switches 112 and 114 connected in series along the receive signal path. Overall insertion loss for this LNA bypass configuration, due to the two series connected RF switches, is typically over 3 dB. RF switch 112 is used to switch the antenna node between the transmitter and receiver, and RF switch 114 is used to bypass the LNA.

Referring to FIG. 2, depicted is a schematic diagram of a bypass circuit for a LNA using one single-pole-triple-throw switch resulting in lower insertion than the bypass circuit shown in FIG. 1, according to a specific example embodiment of this disclosure. The low noise amplifier (LNA) 108 has a bypass option implemented with one single-pole-triple-throw (SPTT) radio frequency (RF) switch 212 coupled between the antenna node 102 and the input of the LNA 108 when in position c, a receiver output node 104 when in position b, and a transmitter node 106 when in position a. When the RF switch 212 is in position b the LNA is bypassed. Overall insertion loss for this LNA bypass configuration is typically about 1 dB.

Referring to FIG. 3, depicted is a schematic block diagram of a RF device utilizing the LNA bypass circuit shown in FIG. 2. A front end module (FEM) 350 may comprise the LNA 108, the RF switch 212, an LNA output disconnect RF switch 324, and an RF switch control 328. Direct current (DC) blocking capacitors 110, 116 and 118 may also be provided in the FEM 350 and coupled as shown in FIG. 3.

An RF device 352 may comprise the FEM 350, a power amplifier (PA) 340, an output low pass filter 342 and an input matching network 338. A DC blocking capacitor 336 may also be provided and coupled as shown in FIG. 3. The RF device 352 may have a transmit input node 334 that may be coupled to the input matching network 338, an antenna node 102 coupled to the common of the RF switch 212, a receiver output node 336 for supplying a RF signal to a receiver detector-demodulator (not shown), and RF switch control input nodes 330 and 332 for controlling the RF switches 212 and 324 to select between transmit and receive, and LNA and LNA bypass modes. The RF device 352 and the FEM 350 may be fabricated on an integrated circuit die (dice) and packaged in an integrated circuit package (not shown).

Figure 4:
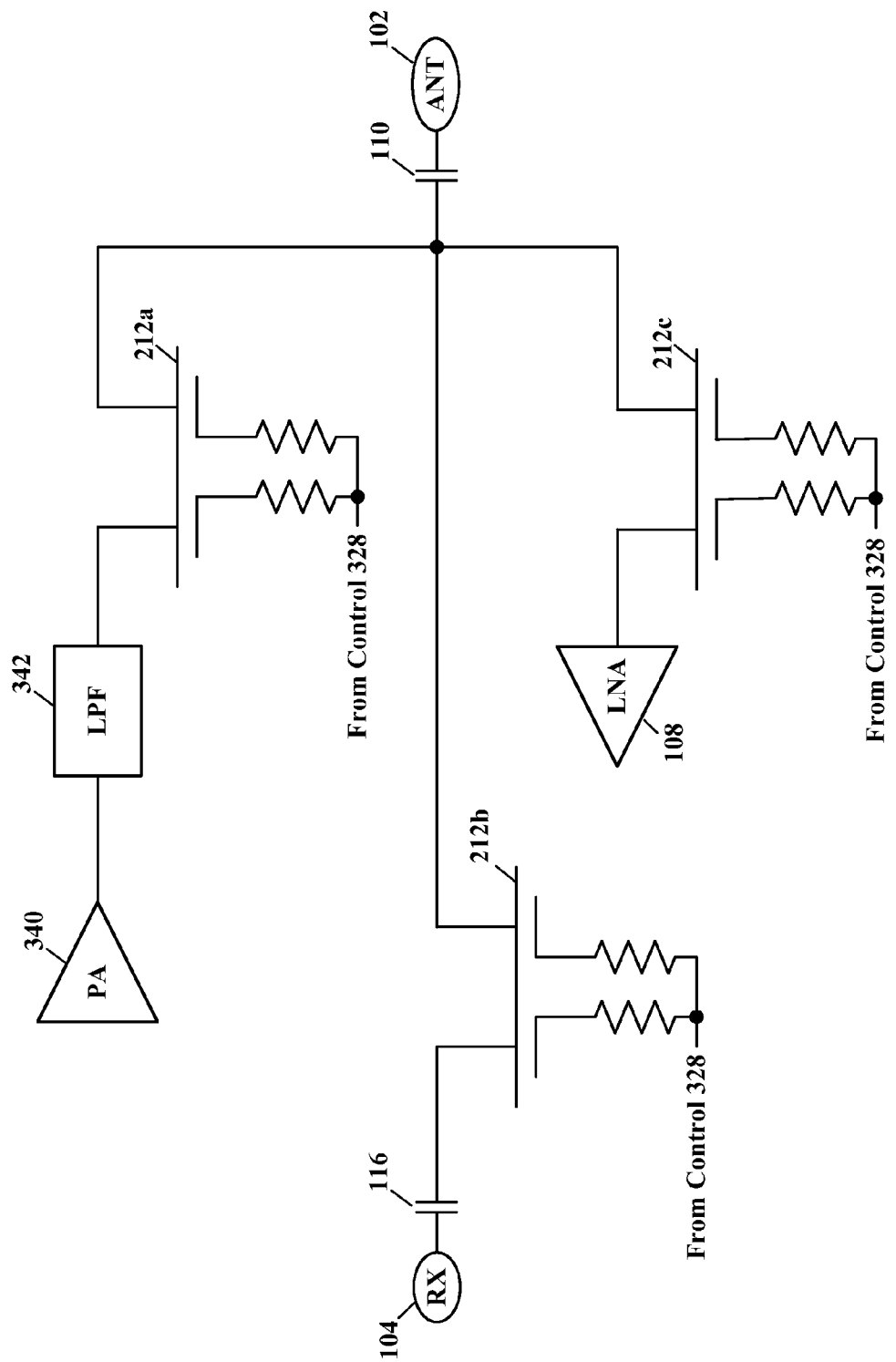
FIG. 4 illustrates a more detailed schematic diagram of the single-pole-triple-throw switch shown in FIG. 2.

Referring to FIG. 4, depicted is a more detailed schematic diagram of the single-pole-triple-throw switch shown in FIG. 2. The SPTT switch 212 may be for example, but is not limited to, three metal oxide semiconductor field effect transistor (MOSFET) RF switches 212a, 212b and 212 that may be arranged with a common source input and isolated independent drain outputs, a common drain input and isolated independent source outputs. These MOSFET RF switches 212a, 212b and 212c may operate at microwave frequencies, e.g., 2 to 6 GHz. The MOSFET RF switches 212 may be single gate, double gate (shown in FIG. 4), triple gate, etc. The MOSFET RF switches 212 may also be configured as complementary metal oxide semiconductor field effect transistor (CMOS FET) switches. Each one of the MOSFET RF switches 212a, 212b and 212c may be controlled by the RF switch control 328 through switch control input nodes 330 and 332.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A radio frequency (RF) from end module (FEM), comprising:
    a low noise amplifier (LNA) having an input and an output; and
    a single-pole-triple-throw (SPTT) switch having a common and selectable first, second and third positions, wherein the common is coupled to an antenna node, the first position is coupled to a transmitter input node, the second position is coupled to a receiver output node,and the third position is coupled to the input of the LAN.

2. The RF FEM according to claim 1, further comprising a direct current (DC) blocking capacitor between the common of the SPTT switch and the antenna node.

3. The RF FEM according to claim 1, further comprising a direct current (DC) blocking capacitor between the first position of the SPTT switch and the transmitter input node.

4. The RF FEM according to claim 1, further comprising a direct current (DC) blocking capacitor between the second position of the SPIT switch and the receiver output node.

5. The RF FEM according to claim 1, further comprising a RF disconnect switch between the output of the LAN and the receiver output node.

6. The RF FEM according to claim 5, further comprising a direct current (DC) blocking capacitor between the RF disconnect switch and the receiver output node.

7. The RF FEM according to claim 1, wherein the SPTT switch comprises first, second and third metal oxide semiconductor field effect transistors (MOSFETs), wherein:
    sources of the first, second and third MOSFETs are coupled to the antenna node;
    a drain of the first MOSFET is coupled to the transmitter input node;
    a drain of the second MOSFET is coupled to the receiver output node;
    a drain of the third MOSFET is coupled to the input of the LAN; and
    gates of the first, second and third MOSFETs are coupled to a RF switch controller.

8. The RF FEM according to claim 7, wherein each of the first, second and third MOSFETs comprises a single gate.

9. The RF FEM according to claim 8, wherein the integrated circuit die is encapsulated in an integrated circuit package having a plurality of connection nodes thereon.

10. The RF FEM according to claim 7, wherein each of the first, second and third MOSFETs comprises a dual gate.

11. The RF FEM according to claim 7, wherein each of the first, second and third MOSFETs comprises a triple gate.

12. The RF FEM according to claim 1, wherein the SPTT switch comprises first, second and third metal oxide semiconductor field effect transistors (MOSFETs), wherein:
    drains of the first, second and third MOSFETs are coupled to the antenna node;

a source of the first MOSFET is coupled to the transmitter input node;
a source of the second MOSFET is coupled to the receiver output node;
a source of the third MOSFET is coupled to the input of the LAN; and
gates of the first, second and third MOSFETs are coupled to a RF switch controller.

13. The RF FEM according to claim 12, wherein each of the first, second and third MOSFETs comprises a single gate.

14. The RF FEM according to claim 12, wherein each of the first, second and third MOSFETs comprises a dual gate.

15. The RF FEM according to claim 12, wherein each of the first, second and third MOSFETs comprises a triple gate.

16. The RF FEM according to claim 1, wherein the LAN and the SPTT switch are fabricated on an integrated circuit die.

17. The RF FEM according to claim 1, wherein the LAN and the SPTT switch operate at gigahertz frequencies.

18. A radio frequency device, comprising:
a power amplifier, an input matching circuit coupled to an input of the power amplifier and a low pass filter coupled to an output of the power amplifier; and
a radio frequency (RF) front end module (FEM), comprising:
a low noise amplifier (LNA) having an input and an output; and
a single-pole-triple-throw (SPTT) switch having a common and selectable first, second and third positions, wherein the common is coupled to an antenna node, the first position is coupled to an output of the low pass filter, the second position is coupled to a receiver output node, and the third position is coupled to the input of the LAN.

19. The radio frequency device according to claim 18, wherein the power amplifier, LAN and SPTT switch are fabricated on an integrated circuit die.

20. The radio frequency device according to claim 19, wherein the integrated circuit die is encapsulated in an integrated circuit package having a plurality of connection nodes thereon.

21. The radio frequency device according to claim 18, wherein the power amplifier, LAN and SPTT switch operate at gigahertz frequencies.

* * * * *